Sept. 20, 1932.　　　　J. LEDWINKA　　　　1,878,934
PRESSED METAL VEHICLE BODY
Original Filed May 26, 1928　　3 Sheets-Sheet 1

INVENTOR.
JOSEPH LEDWINKA.
BY
John O. Tarbox
ATTORNEY.

INVENTOR.
JOSEPH LEDWINKA.
BY
ATTORNEY.

Sept. 20, 1932.          J. LEDWINKA                1,878,934
                    PRESSED METAL VEHICLE BODY
          Original Filed May 26, 1928    3 Sheets-Sheet 3

INVENTOR.
JOSEPH LEDWINKA.
BY
ATTORNEY.

Patented Sept. 20, 1932

1,878,934

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

PRESSED METAL VEHICLE BODY

Original application filed May 26, 1928, Serial No. 280,694, and in Germany May 27, 1929. Divided and this application filed July 31, 1929. Serial No. 382,377.

My invention relates to pressed metal vehicle bodies and particularly to such bodies having their walls built up in large part of relatively large stampings forming sub-assembly units, which, when joined together, form a rigid self-supporting body superstructure adapted to be handled, shipped, and if desired, painted and trimmed, prior to their final assembly with an underframe serving as a chassis and carrying all or substantially all of the floor and seat supports, the body superstructure being adapted, in the final assembly with the underframe, to form a unitary combined body and chassis structure.

This application is a division of my prior application Serial No. 280,694, filed May 26, 1928, entitled Pressed metal vehicle bodies.

It has heretofore been proposed to construct the side and front walls of such bodies of large stampings of sheet metal forming inner and outer panels spaced in their bodies and joined together in their margins and the margins of the door and window openings. It has also been proposed to construct such bodies in separate front, side, rear and roof unit sub-assemblies for convenience of manufacture and shipment and to reduce costs.

It is among the objects of my present invention to simplify and otherwise improve the construction of the unit sub-assemblies of such bodies, to further reduce the weight of the complete assembly, to further reduce the cost of manufacture.

I attain these objects generally by substantially eliminating the inner paneling and particularly the large expansive inner panel stampings as heretofore employed in the side unit sub-assemblies, and by also eliminating, furthermore, portions of the inner paneling in the front unit sub-assembly, in short eliminating inner paneling and reinforcement wherever I find I can dispense with it and relying in large measure, throughout the greater portion of the body wall, on the inherent strength and stiffness provided by the curvature of the large outer panel stampings extending around door and window openings and on the hollow intercommunicating angle and channel sections provided by the deep flanged construction thereof around said openings and in the outer margins of the panels, where they are joined to adjacent parts in final assembly.

The rear unit is extended forwardly at the top to a point adjacent the rear door post, which brings the joint of its forward edge with the roof at a location affording increased headroom for the occupants of the rear seat and also rendering the sub-assembly unit formed by the sides, front and rear units, which is sometimes handled and shipped as a unit, stiffer and stronger, because of this greater extent of the rear unit.

Other and further objects and advantages and the means by which they are attained will become apparent from the further disclosure of the invention in the following detailed description, taken with the accompanying drawings, in which Figs. 1 and 2 are views, respectively, in side elevation and in plan of a body of the sedan type in which I have shown my invention embodied, the cowl portion being shown in dotted lines.

Fig. 3 is a view in side elevation of the left hand side unit.

Figure 1:
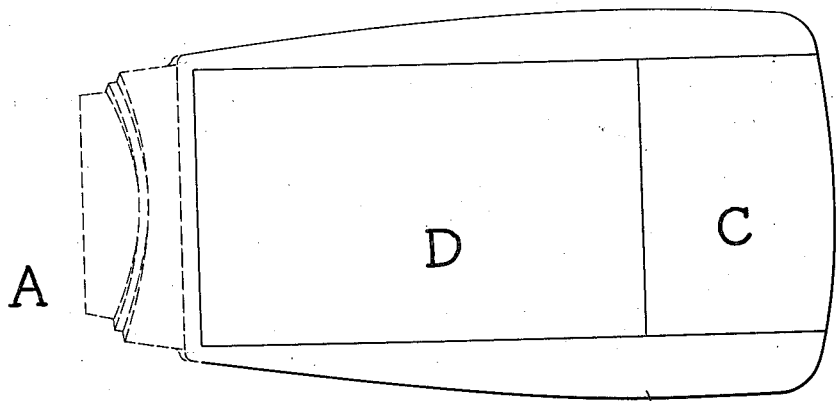
Figure 2:
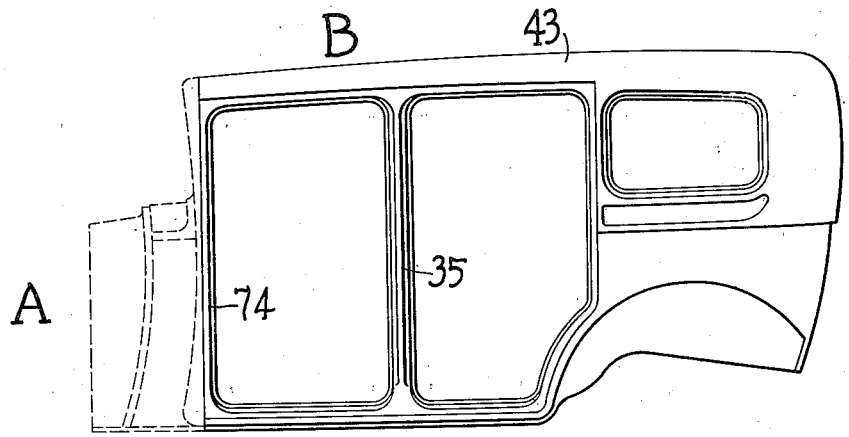

Figs. 6 to 15, inclusive, are detail sectional views taken on the correspondingly numbered section lines of Fig. 3.

In the drawings, the front unit is designated generally by the letter A and comprises as heretofore, the cowl and portions of the front door posts and the windshield frame; the side units designated by B extend from the front posts to and around the rear quarters and at the top over the roof quarter to form the sides of the roof; the rear unit designated by C extends from the bottom of the body to and around to rear top quarter and forwardly to a point adjacent the rear door posts; and the roof unit designated by D fits into the rectangular opening between the top edges of the front, side and rear units and is joined thereto along its margins.

The side unitary sub-assemblies B are comprised in the main, and depend for their strength and rigidity, in large measure, on the large outer panel stamping 35 extending from the front door post to and around the rear quarter and containing all the door and window openings in the side of the body. Around the door openings this panel stamping is formed with deep transversely extending flanges 36 of the full depth of the body wall and well rounded in the corners of the openings, these flanges themselves being laterally flanged into the openings as 37, and forming door overlaps. At the rear quarter window opening stamping 35 is likewise flanged inwardly to form the curved window moulding 38 and flanged in the plane of the window at 39. At the bottom the stamping 35 is flanged inwardly at 40 and downwardly at 41 to form an inwardly facing channel section threshold portion between the front post and the wheel housing formed by the depression 42 in the panel. At the top it is arched inwardly at 43 to form the side of the roof and formed at its edge with a double rabbet 44 and 45 to receive the side edges of the roof unit D. At the rear and that portion of the top where it joins the rear panel unit C it is formed with an inwardly extending flange 46.

This curvilinear and deeply flanged construction of the outside panel stamping around door openings and in its edges giving it substantially throughout a hollow construction of intercommunicating channels facing inwardly, gives great strength, and rigidity to the side unit, even though made of relatively light gauge sheet metal. I have found that its strength and rigidity is such that I can dispense with the greater portion of the inner reinforcing paneling for these side units B, and thereby obtain a substantially lightened construction, without any substantial sacrifice of strength.

Figure 4:
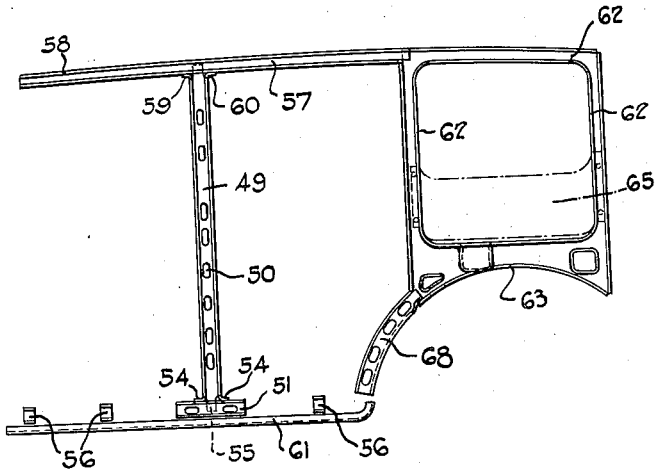
Fig. 4 is a view in side elevation of the inner reinforcing members for the side unit showing them located in their relative positions of assembly.
Figure 5:
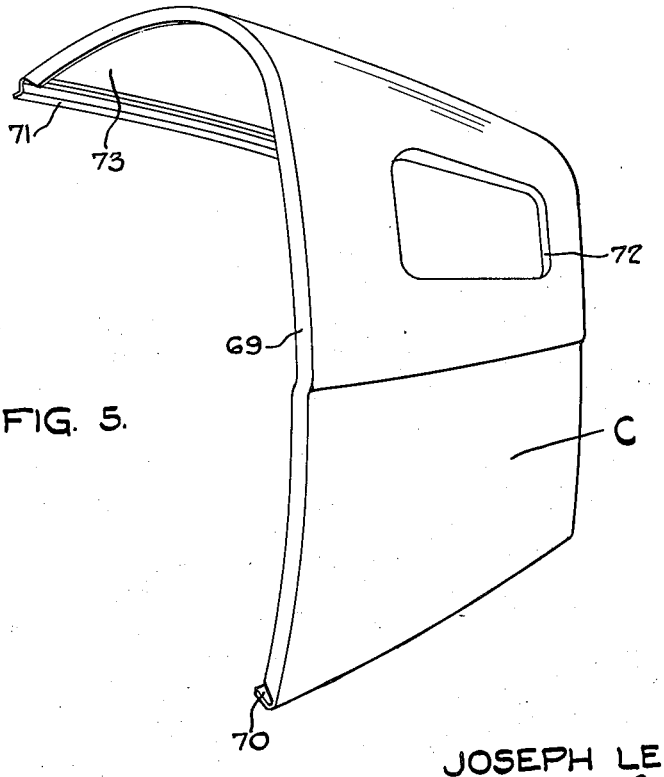
Fig. 5 is a perspective view of the rear unit.

Accordingly, I have discovered that I may reduce the inner reinforcing structure for the outer panel stamping to the merest skeleton of a framework, as shown in Fig. 4, all the parts of which are, like the outer panel stamping, of relatively light gauge sheet metal stock. Furthermore, this inner reinforcing structure may be made from relatively small pieces of stock subsequently welded together and/or to the outer panel by a relatively few spot welding operations, that most rapid and sure method of joining the sheet metal parts.

These inner reinforcements are required, in the main, in the vertical door post portions from which the doors are hinged and against which they close. At the post portion between the door openings, shown in section in Fig. 8, the outer panel is shown as having an inwardly facing channel cross section, the channel having its side walls 47 and 48 rabbeted to receive the correspondingly rabbeted edges of the doors. To strengthen and interbrace the side walls of the post and to provide a foundation for securing the trim, an outwardly forming channel member 49 is telescoped within the inner widened portion of the channel and located in the channel post by the engagement of its side wall edges with the rabbet in the side walls 47 and 48 of the post. The adjacent walls of the telescoped channels are readily secured as by spot welding, access being had to the inside of the post through the openings 50, Fig. 4, provided in the member 49. The member 49 is founded at the bottom upon a short channel member 51, also facing outwardly, bridging the side walls 52 and 53 of the channel section threshold portion being secured to said side walls 52 and 53, as by spot welding. The member 49 is secured to the member 51 by welding integral tabs 54 extending laterally from the side walls of member 49 to the top side wall of member 51 and a tab 55 extending the base wall of member 49 to the base wall of member 51.

In the thresholds of the door openings, the inwardly facing channel section threshold is further reinforced by spaced outwardly facing U-shaped members 56, three being shown in Fig. 4, one being shown in section in Fig. 9, the side walls of which are spot welded to the side walls of the channel section threshold portion.

Above the doorway openings is secured an angle strip 57 having a vertical arm to secure the interior trim and a horizontal arm welded to the horizontal door jamb flanges 36 of the outer panel stamping above the doorway openings. This angle strip is reinforced at the top by a narrow edge flange 58. The upper end of post reinforcing channel 49 is secured to the angle strip 57 by tabs 59 and 60 similar to tabs 54 and 55 at its lower end and in a similar manner.

These three members 49, 51 and 57 may be joined before assembly to the outer panel stamping to form a unitary subassembly of substantially I-shape.

To cover the raw edge of the metal of the bottom flange 41 of the outer panel stamping in the threshold section, and to reinforce said edge flange and give more body thereto, a strip 61, Figs. 4 and 9, is bent over said flange. The securing rivets 29 for securing the lower edge of the body in the threshold section thereof to the sides of the chassis sills 30 pass through this reinforced edge flange, to more securely fasten the body superstructure in position.

A reinforcing and window frame supporting stamping 62 extends around the rear quarter window opening and is downwardly extended to the crown of the wheel housing 63. It is secured as heretofore, by spot welding its lower flanged edge which conforms with the crown of the wheel housing 63 to the same. As shown in Figs. 4, 10, 11 and 14, it is of substantially outwardly presenting channel form at sides and top, and nests with and is secured to the substantially Z-section sides and top of a window frame stamping 64, the latter having one arm thereof secured, as by crimping, to marginal flange 39 of the outer panel extending around the window opening. In Fig. 4, I have shown in dotted lines, a window regulator panel 65 removably secured to the stamping 62 below the window opening.

The side of the stamping 62 rising between the window and the rear door opening has its forward side wall secured to the transverse door jamb flange 36 of the outer panel stamping, being spaced therefrom, as shown in Fig. 11, to receive in said space a hinge bracket 66. A hinge bracket 67 is likewise secured to the forward face of transverse flange 36 forming the jamb face of the front post. As shown in Fig. 16 at the hinge location it is offset to receive, between it and the jamb face 36, the hinge strap 67.

The rear end of the vertical arm of the strip 57 is extended to overlap the bottom wall of the channel section top of stamping 62, and is secured thereto as by spot welding. To reinforce the inwardly presenting channel section lower curved portion of the rear door post portion of the outer panel stamping, a Z-section strip 68 is provided to bridge the mouth of the channel by its web and having its arms secured, as by spot welding, respectively to the door jamb flange 36 and to the crown of the wheel housing 63. The upper end of this strip 68 overlaps and is welded to the lower forward corner of the stamping 62.

Each of the reinforcing stampings at the sides and top of the doorway openings are provided with arms secured to the laterally extending flange 36 and other arms to which the upholstery may be applied extending substantially in the plane of the flanges 37, and these arms are in each case formed by an offset portion forming, with the flange 36 a pocket 75 to receive a portion of a windbreak (not shown) the outer portion of which serves to cover the raw edges of flanges 37.

By the foregoing construction the side unit is adequately reinforced and strengthened around the door and window openings, and by the use of relatively small stampings of light gauge sheet metal stock, thereby adding very little to weight of the outer panel stamping, which in itself, because of its hollow, intercommunicating channel section, and flanged margins, supplies the greater portion of the overall strength and rigidity of the side unit. The novel rear unit C of my invention comprises a unitary stamping having side flanges 69 for securement to the edge flanges of the side units, a bottom flange 70, to receive the rear edge of a seat structure and a forward flange 71, which may be double rabbeted, as shown to correspond with the edge flanges of the side and front units, for receiving the edge of the roof unit D. The panel is also flanged inwardly around the rear window opening as shown at 72. The chief feature of novelty in this unit is its forward extension 73 at the top to a point adjacent the rear door opening, whereby it not only forms a wide transverse brace for the top of the body superstructure unit when assembled with the side and front units and prior to the assembly of the roof unit D, but it also brings the joint between the roof and rear panel, which necessarily projects downwardly somewhat below the plane of the panel, to a location where the maximum vertical height of the inside of the body is not interfered with, opposite the door opening, and over the rear seat, where maximum headroom is desired.

The manner of assembly of the units forming the body proper or body superstructure is similar to that heretofore proposed, the side units being joined to the front unit by riveting or otherwise securing the flanges 74 at the front vertical edges of the side units B to the welded together flanges of the front unit A, and to the rear unit by spot welding the adjacent edge flanges 46, 69 of the side and rear units respectively, and then crimping over the right angularly extended portions 69' of the flanges 69 of the rear unit over the flanges 46 of the side units, thereby forming a strong secure and weatherproof joint. In the drawings, the portions 69' are shown in dotted lines in their position before crimping over and in full lines in the crimped over position.

The four units, front, side and rear, so joined for a rigid self-supporting structure which can be handled and shipped, and if desired, painted and trimmed, prior to its assembly with the underframe or chassis and prior to assembly with the roof unit D. The roof unit D may be an all steel panel or any other usual roof construction, and may be assembled before or after the body superstructure is painted and trimmed or before or after it is shipped from the body manufacturer to the automobile manufacturer. When the roof unit is assembled by connecting it to the rabbeted flanges of the front, side and rear units, it still further stiffens and strengthens the body structure, and the unity of the structure is enhanced if the roof panel is also a sheet metal panel.

The body so constructed is very light in weight, has the beauty of line which can be obtained by the large steel stampings, is very roomy in its interior, because of the minimum of interior bracing, the paneling of the outer shell forming in large measure the combined frame and body, and it is very strong and rigid by reason of its deep drawn hollow intercommunicating angle and channel cross sections framing the door and window openings and reinforcing the edges of the large outer panel stampings and by reason of the flanged joints between the adjacent panels forming additional bracing and reinforcing means. The location and extent of the inner reinforcing and bracing stampings, adds the additional strength where it is needed.

While I have herein described a specific embodiment of my invention which is at present believed by me to be the preferred embodiment, it will be understood that various changes and modifications may be made without departing from the spirit and scope of the appended claims.

What I claim is:

1. In a vehicle body construction, a side unit including a doorway opening and deriving its strength in large part from a unitary stamping extending around the doorway opening and flanged inwardly around said opening and curved inwardly at top to form the side of the roof, and an angular stiffening strip having an arm secured to the inwardly extending flange at the top of the doorway opening.

2. In a vehicle body construction, a side unit having doorway openings including a main stamping flanged inwardly around the margins of the doorway openings and extended inwardly at top and bottom to form intercommunicating channels above, below and between said doorway openings, and an inner generally I form reinforcing member of generally outwardly presenting form telescoped within the interconnecting channels of the stamping and secured to the side walls of said channels.

3. In a vehicle body construction, a side unit including a doorway opening and deriving its strength in large part from a unitary stamping extending around the doorway opening and flanged inwardly at the margin of the doorway opening and offset inwardly to provide a wheel housing, the forward edge of said wheel housing forming with the flange at the adjacent margin of the doorway opening the sides of an inwardly presenting channel post portion, said post portion being reinforced by a Z-section strip having its web extend across the mouth of the channel and its arms secured, respectively, to side walls of the channel.

4. In a vehicle body construction, an outer panel flanged inwardly at the margin of the doorway opening to substantially the full depth of the body wall and then laterally into the doorway opening in the plane of the wall, and an inner reinforcing strip of angular form having one arm secured to the inwardly extending flange at the margin of the doorway opening, and another arm lying for the most part substantially in the plane of said lateral flange but joined to the first-named arm by an offset portion forming with the inner portion of the inwardly extending flange of the outer panel a pocket to receive a portion of a trim member.

5. In a vehicle body construction comprising side and rear wall units of pressed metal, a rear wall unit comprising a unitary sheet metal stamping extending from the bottom of the body over the rear top quarter forwardly to a vertical plane which passes a substantial distance in front of the heads of the passengers when seated in the rear seat of the vehicle and in this plane downwardly flanged to form a transverse reinforcement and a complemental part of the joint with the forward portion of the roof, whereby the heads of the passengers when they are jolted upwardly from their seats may not strike the transverse reinforcing and joint constituting structure.

In testimony whereof I hereunto affix my signature.

JOSEPH LEDWINKA.